United States Patent
Hamasaki et al.

(10) Patent No.: US 7,862,934 B2
(45) Date of Patent: Jan. 4, 2011

(54) BATTERY HAVING A COLLECTOR PLATE

(75) Inventors: Kazuki Hamasaki, Sumoto (JP); Yoichiro Shibata, Awaji (JP); Fumiaki Nakata, Minamiawaji (JP); Makoto Nakagawa, Minamiawaji (JP); Etsuya Fujisaka, Awaji (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 518 days.

(21) Appl. No.: 11/391,694

(22) Filed: Mar. 29, 2006

(65) Prior Publication Data
US 2006/0234120 A1    Oct. 19, 2006

(30) Foreign Application Priority Data

Mar. 30, 2005 (JP) ............................. 2005-097772
Feb. 15, 2006 (JP) ............................. 2006-037476

(51) Int. Cl.
*H01M 10/40* (2006.01)
(52) U.S. Cl. ...................................... 429/337; 429/217
(58) Field of Classification Search ................ 429/211, 429/94, 161, 164, 337, 217, 231.4, 231.95, 429/329, 330
See application file for complete search history.

(56) References Cited

U.S. PATENT DOCUMENTS

| | | | |
|---|---|---|---|
| 4,332,867 A | 6/1982 | Tsuda et al. | |
| 5,861,225 A * | 1/1999 | Corrigan et al. | ............. 429/223 |
| 6,187,473 B1 | 2/2001 | Tamezane et al. | |
| 6,899,973 B2 * | 5/2005 | Nakanishi et al. | ............. 429/94 |
| 7,273,678 B2 * | 9/2007 | Akita et al. | ................. 429/211 |
| 2002/0142211 A1 | 10/2002 | Nakanishi et al. | |

FOREIGN PATENT DOCUMENTS

| | | |
|---|---|---|
| JP | 56-67166 A | 6/1981 |
| JP | 60-072160 A | 4/1985 |
| JP | 11-149914 A | 6/1999 |
| JP | 2004111120 A | 4/2004 |

OTHER PUBLICATIONS

Chinese Office Action dated Mar. 6, 2009 issued in corresponding Chinese patent Application No. 200610068355.X.
Japanese Office Action dated Jun. 8, 2010, issued in corresponding Japanese Patent Application No. 2006-037476.

* cited by examiner

*Primary Examiner*—Jennifer Michener
*Assistant Examiner*—Monique Wills
(74) *Attorney, Agent, or Firm*—Westerman, Hattori, Daniels & Adrian, LLP

(57) ABSTRACT

The object of the present invention is to provide a reliable alkaline storage battery having a structure by which a short circuit between the electrodes can be prevented in the manufacturing procedures.

To achieve this object, the present invention provides a cylindrical battery that includes an electrode assembly including a positive electrode plate and a negative electrode plate spirally wound together and sandwiching a separator. The collector plate includes a main body. One or more convex parts, each having a top extending linearly, are formed on a main surface of the main body by bending processing. A part of at least one of the convex part is cut out to form a cutout region. The collector plate is welded to the end part of the electrode assembly at the top of each convex part.

11 Claims, 6 Drawing Sheets

BATTERY HAVING A COLLECTOR PLATE

BACKGROUND OF THE INVENTION (1) Field of the Invention

The present invention relates to storage batteries, such as Ni—Cd batteries, Ni-MH batteries, and Li-ion batteries. In particular, the present invention relates to a battery having a collector plate welded to one end of electrode plates included in a spirally wound electrode assembly.

(2) Description of the Related Art

In recent years, alkaline storage batteries, such as Ni—Cd batteries and Ni-MH batteries, and Li-ion batteries and the like are used as batteries for electric vehicles, electric motorcycles, power-assisted bicycles and so on, which require large current. An alkaline storage battery used for this purpose is required to have high output characteristics and a high energy density. To achieve the high output characteristics, current-collector parts are required to be of low resistance, and the electrode substrate at the electrode plate ends and the collector plate are required to be in close contact, for instance. Also, the welding strength between the collector plate and the electrode substrate has to be high to prevent the collector plate from breaking away from the electrode substrate due to vibration during use.

In a usual manufacturing process of the alkaline storage battery, firstly, a positive electrode plate and a negative electrode plate, which sandwich a separator, are spirally wound together to form an electrode assembly. An electrode substrate of the negative electrode plate included in the electrode assembly is welded to the negative collector plate, and the electrode substrate of the positive electrode plate included in the electrode assembly is welded to the positive collector plate. Next, the electrode assembly is housed in a metal casing which also serves as a negative terminal, and the negative collector plate is welded to the bottom of the casing. Meanwhile, a collector lead extended from the positive collector plate is welded to the bottom of a closure construction which also serves as a positive terminal. Then, the casing is filled with an electrolyte, and the closure construction is attached to an opening part of the casing so that an insulating gasket is sandwiched therebetween. In this way, the manufacturing process of an enclosed alkaline storage battery is completed.

To further improve the energy density of the alkaline storage battery, nickel foam is used for the Ni positive electrode substrate by which the amount of the enclosed active material is increased. Since the nickel foam is highly porous and of a low density, it is difficult to directly weld the nickel foam to the positive electrode assembly. However, Document 1 (Japanese Laid-open. Patent Application Publication No. 11-149914) suggests welding a ribbon-shaped tab at the end of the nickel foam, and welding the tab to the positive electrode assembly.

When this method is adopted, the tab is additionally required, which means that the number of required parts is increased. Also, the welding process is required. Accordingly, the manufacturing cost increases. Regarding this problem, if a collector plate including a convex part having a V-shaped cross-section is used as disclosed by Document 2 (Japanese Laid-open Patent Application Publication No. 60-72160), and the welding method as disclosed by Document 3 (Japanese Laid-open Patent Application Publication No. 56-67166) is used, it is possible to directly weld the electrode assembly to the electrode substrate made from the nickel foam. The following more specifically describes this method.

As described in Document 2, a convex part 54 having a V-shaped cross-section is formed on one of main surfaces of the main body 51 (see FIG. 9) included in the collector assembly 50. Then, as FIG. 9A shows, a pair of electrodes R1 and R2 for welding (hereinafter called the welding electrodes) is disposed so as to sandwich, as viewed from above the main surface of the collector plate 50, a region where the convex part 54 and the end of the positive electrode plate (61*c* in FIG. 1) included in the electrode assembly 50 contact with each other. With this structure, as described in Document 3, the pair of the welding electrodes R1 and R2 is fed, and Joule heat is generated at the top 54*a* (the top extending linearly: hereinafter called "the linear top part") of the convex part 54 and its vicinity due to the electrical resistance characteristics of the collector plate 50. Accordingly, the linear top part 54*a* of the convex part 54 and the end part of the positive electrode plate which contacts with the linear top part 54*a* are partially fused, and welded to each other.

In the welding method described above, the region where the Joule heat is generated is not limited to the linear top part 54*a* and its vicinity. This is because the amount of generated Joule heat is proportional to the current density of a current path relating to the welding, and higher Joule heat is generated where the current density is higher. For instance, on the path of the welding current, the current density in a region where the width is narrowest (e.g. a part X indicated by a dotted line in FIG. 9A) is higher than the current density in the other regions. Therefore, according to the collector plate 50, the heating value is highest at the part x, not at the linear top part 54*a*. In the worst case, the collector plate might be burnt off at the part X.

Furthermore, as the part Y (the edge of a groove having a substantially v-shaped cross-section) represented by a dotted line in FIG. 9A shows, if the length of the linear top part 54*a* and the current path relating to the welding is almost the same, the heating value is almost the same at any points on the part Y. Therefore, the collector plate might be burnt off at the part r in the same manner as in the case of the X part.

If such a burn-off happens, the collecting efficiency of the battery might be deteriorated, and the operating voltage at the discharge might be decreased. Further, another problem might because. Namely, when the burn-off happens, sparks might fly into the electrode assembly, and cause a short circuit.

As a measure for preventing such a problem, it is possible to reduce the welding current and prevent the burn-off. However, this makes the welding between the collector plate and the electrode plate insufficient, and highly possibly causes a problem of welding strength and current conduction.

As described above, there still is a problem to be solved regarding a method of welding between a collector plate and an end of an electrode assembly.

SUMMARY OF THE INVENTION

The object of the present invention is to provide a reliable alkaline storage battery having a structure by which a short circuit between the electrodes can be prevented in the manufacturing procedures.

The above object is fulfilled by a battery that includes an electrode assembly including a positive electrode plate and a negative electrode plate layered so as to sandwich a separator, a collector plate being connected to an end part of at least one of the positive electrode plate and the negative electrode plate, wherein the collector plate includes a main body, on one main surface of which one or more convex parts each having a top extending linearly are formed, one or more cutout regions are formed by partially cutting out each convex part, and each convex part is welded to the end part of the electrode assembly at a plurality of welding points.

With the present invention having the stated structure, the current does not flow through the cutout region of the convex part formed on the main body of the collector plate. This is a first advantageous effect. Accordingly, in the collector plate, the current density at the remaining top part of the convex part facing the cutout region can be higher than the case where the cutout region is not formed.

On the principle described above, according to the collector plate of the present invention, sufficient heat can be generated at the top part of the convex part using the same level of electric power as the conventional technique, and strong welding parts can be formed around each top part.

Meanwhile, since the cutout region is formed in the collector plate, there is no region where the current density during the welding is higher than the top part, and unnecessary heat is not generated. Therefore, the Joule heat for the welding is generated only at the convex part, and the burn-off is prevented from being caused in regions other than the top part.

As a second advantageous effect, in the case where a substantially linear top part is formed on the convex part, the linear top part intersects with the end part of the electrode plate included in the spirally wound electrode assembly at a plurality of contact points. Accordingly, the linear top part is connected to the end part with a sufficient number of contact points. This maintains excellent collecting efficiency and achieves a high output.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

The following describes an embodiment and examples in the case of applying the present invention to a Ni—Cd storage battery. However, the present invention is not limited to this, and it can be appropriately modified within the scope of the effect of the invention.

First Embodiment

Structure of Ni—Cd Secondary Battery

Figure 1:
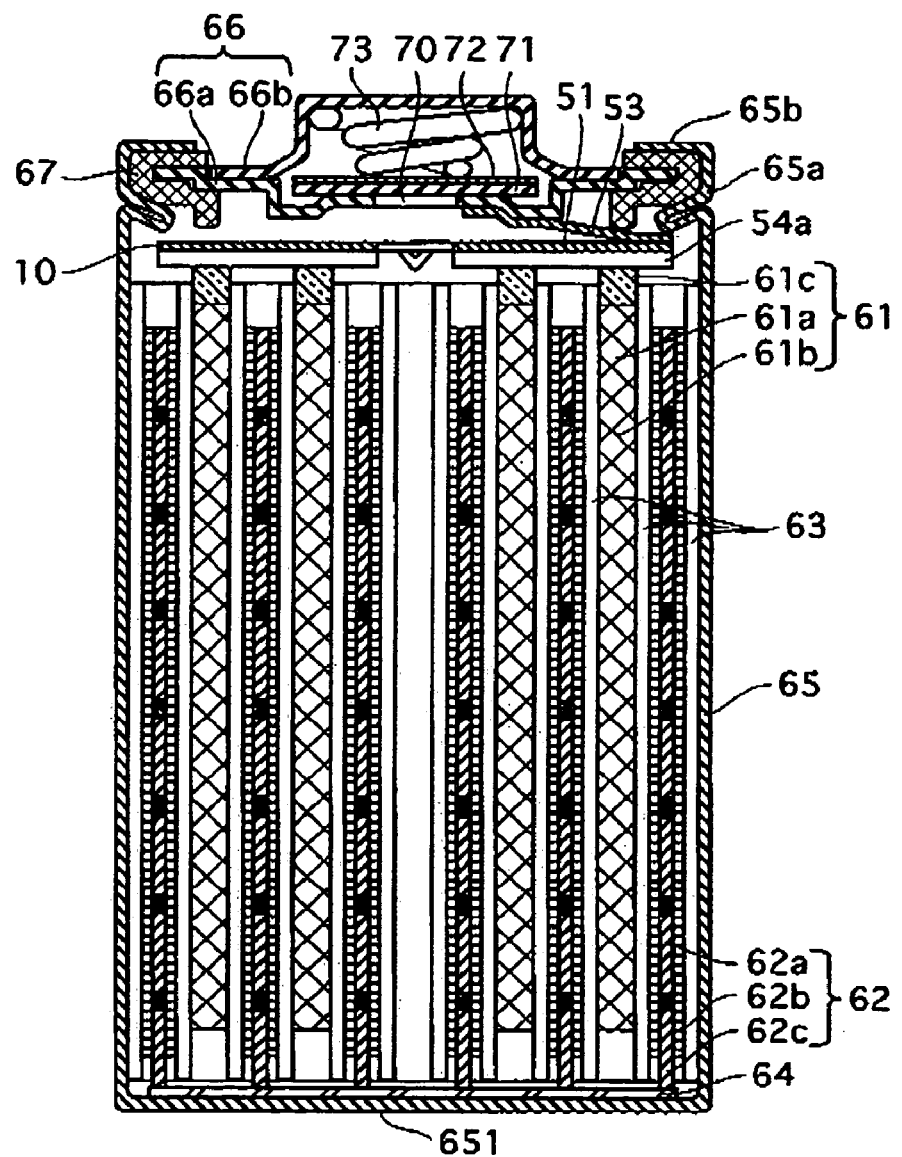
FIG. 1 is a cross-sectional view showing an internal structure of a cylindrical Ni—Cd storage battery according to the first embodiment.

FIG. 1 is a cross-sectional perspective view of a cylindrical nickel cadmium storage battery (Ni—Cd storage battery) as an example of the alkaline storage battery according to the first embodiment of the present invention.

The Ni—Cd battery includes, for instance, an SC-size cylindrical casing 65, in which an electrode assembly 2 is housed and impregnated with an electrolyte. The electrode assembly 2 includes an Ni positive electrode plate 61 and a Cd negative electrode plate 62, which sandwich a separator 63, are spirally wound together. The casing is sealed with a closure construction (a closure plate 66a and a closure cap 66b).

An alkaline solution is used as the electrolyte. In this embodiment, an aqueous solution mainly including potassium hydroxide (KOH) is used.

The Ni positive electrode plate 61 is formed by filling slurry including a binder and a positive active material which mainly includes nickel hydroxide. The Ni positive electrode is connected to the closure cap 66b via the positive collector plate 10 and the closure plate 66a.

The Cd negative electrode plate 62 is formed by filling slurry including a binder and a negative active material which mainly includes cadmium oxide. The end part 62c of the Cd negative electrode is connected to each of the negative electrode plate 64 in a circular shape and a bottom part 651 which also serves as the negative electrode terminal of the casing 65.

The closure plate 66a is attached to the opening part of the casing 65 by the insulating gasket 67, and the positive closure cap 66b which also serves as the positive terminal is disposed so as to cover a center opening part of the closure plate 66a. Between the closure plate 66a and the positive closure cap 66b, a valve plate 71, a retainer plate 72 and a coil spring 73 are placed from bottom to top in this order. The valve plate 71 and the retainer plate 72 are pressed against a part around a gas passage 70 by the elastic force of the coil spring 73, and serve as a safety valve.

The Ni—Cd storage battery according to this embodiment is characterized by the structure of the peripheral part of the positive collector plate 10. The following describes the positive collector plate 10.

Structure of Positive Collector Plate 10

Figure 2A:
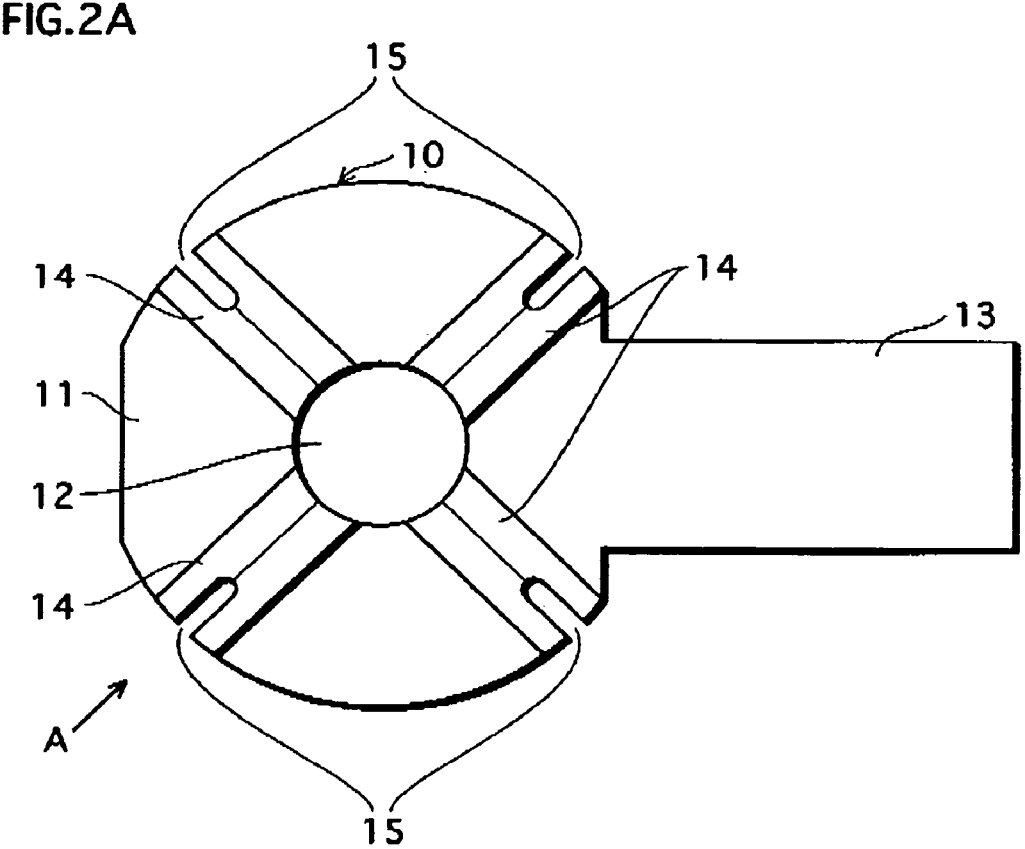
FIG. 2A is a front view of the positive collector plate of the example A.
Figure 2B:
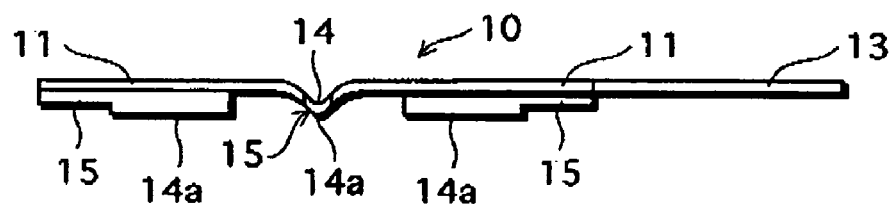
FIG. 2B is a side view of the positive collector plate of the example A.
Figure 2C:
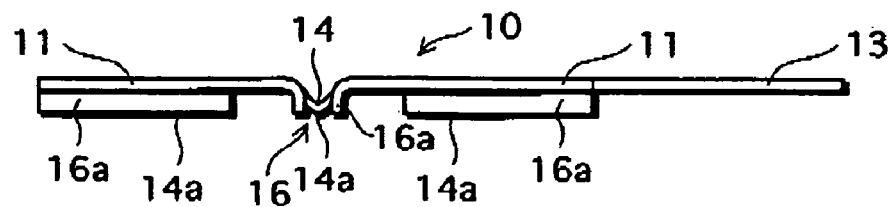
FIG. 2C is a side view of the positive collector plate of the example B.

FIGS. 2A, 2B and 2C show the structure of the positive collector plate 10 according to the first embodiment of the present invention. FIG. 2A is a plan view of the positive collector plate 10. FIG. 2B is a side view of the positive collector plate 10 as viewed in the direction indicated by an arrow A in FIG. 2A.

The positive collector plate 10 shown in FIG. 2A is formed by die-cutting a nickel-plated sheet steel having a thickness of 0.25 mm. Accordingly, the main body 11 having a main surface in a substantially circular shape and a lead part 13 having a main surface substantially in a rectangular shape are formed as an integral part. An opening region 12 in a circular shape is formed in the central part of the main body 11. Regarding the size of the positive collector plate 10, the maximum diameter of the main body 11 is 17.5 mm for instance, and the maximum diameter of the opening region 12 is 5.3 mm for instance.

The opening region 12 is for inserting a resistance welding electrode used for welding the negative collector plate 64 and the bottom part 651 of the casing 65 to each other. The lead part 13 in a substantially rectangular shape is formed so as to extend from the main body 11.

Further, a plurality (four threads in this example) of convex parts 14 are respectively formed on the main body 11 so as to equiangularly extend from the center region 12 to the peripheral part of the main body 11 (Each of the convex parts 14 is hereinafter called the convex part 14"). The convex part 14 is formed by a bending process so as to have a V-shaped cross-section and to project from the side of one of the main surfaces of the main body 11 (the front side of the drawing, in this example) toward the side of the other one of the main surfaces (the back side of the drawing, in this example). Regarding the size of the convex part 14, the height is 0.45 nun and the width is 2 mm, for instance.

As viewed from the back side of the positive collector plate 10 (the side of the electrode assembly 2), the convex part 14 includes a linear top part 14a having a top part in a linear shape extending in the longitudinal direction of the convex part 14. The linear top part 14a of the convex part 14 is a part to be in point-contact with the end part 61c of the Ni positive electrode plate included in the electrode assembly 2. The convex part 14 and the end part 61c are welded to each other at the contact point.

A part of each linear top part 14a in the vicinity of the periphery part of the main body 11 is cut out in the longitudinal direction of the linear top part 14a. The length of the cutout is predetermined (e.g. 2 mm). The cutout region 15 formed by the above-described cutout has a peripheral part in a long shape having a predetermined length.

Advantageous Effect of Positive Electrode Plate 10

The first advantageous effect of the positive electrode plate 10 with the above-described structure is that current does not flow between regions on both sides of the cutout region, in the width direction of the cutout region 15. Accordingly, in the positive electrode plate 10 with the stated structure, the cutout region 15 can heighten the current density of the region close to the opening region 12.

As a result, in the positive collector plate 10 with the stated structure, sufficient Joule heat is generated at the linear top part 14a which is in contact with the end part 61c of the positive electrode plate 61. Accordingly, the linear top part 14a and the end part 61c can be welded firmly to each other.

Meanwhile, in the positive collector plate 10, except for the above-described region, there is no region where the current density is higher than the linear top part 14a due to the cutout region, and unnecessary Joule heat is not generated. This means that sufficient Joule heat is generated only in the welding part.

The second advantageous effect of the positive electrode plate 10 with the above-described structure is that the linear top part 14a formed on the positive collector plate 10 intersects with the end part 61c of the positive electrode plate 61 that is spirally wound in the electrode assembly 2. Accordingly, the linear top part 14a can be in contact with the end part 61 at a sufficient number of contact points. This means that the positive collector plate 10 can maintain a high current-collecting efficiency and achieve a high output.

In the first embodiment, the cross-section of the convex part 14 is in a V-shape. However, the present invention is not limited to this. The shape of the cross-section may be different. However, in view of actual manufacturing efficiency, it is preferable that the cross-section of the top part 14 is substantially in a U-shape or substantially in a semicircular shape if not in a V-shape.

Different variations of Collector Plate

The following describes possible variations of the positive collector plate included in the alkaline storage battery according to the present invention. In the following description, the positive collector plate 10 according to the first embodiment is referred as "the example A", and each example is explained based on differences from the example A.

Example B

FIG. 2C is a side view of a positive collector plate 10c of an example B according to a modification of the example A.

The difference from the positive collector plate 10 of the example 10 is that the cutout region is not formed by die-cutting, but by flanging. Accordingly, a projection 16a having a height of 0.45 mm is formed on the main body 11 in addition to the convex part 14. The projection 16a projects in the vertical direction to the main surface of the main body 11.

With the positive collector plate 10c according to the example B having the stated structure, the welding points for the welding to be welded to the end part 61c are formed not only at the linear top part 14a of the convex part 14, but also at the projection 16a. This is because the projection 16a is also applied heat generated at the linear top part 14a. Therefore, the number of the welding points is larger than that of the example A. This means that in addition to the advantageous effect of the example A, an improvement of the collecting efficiency and the welding strength can be achieved by the example B.

Example C

Figure 3:
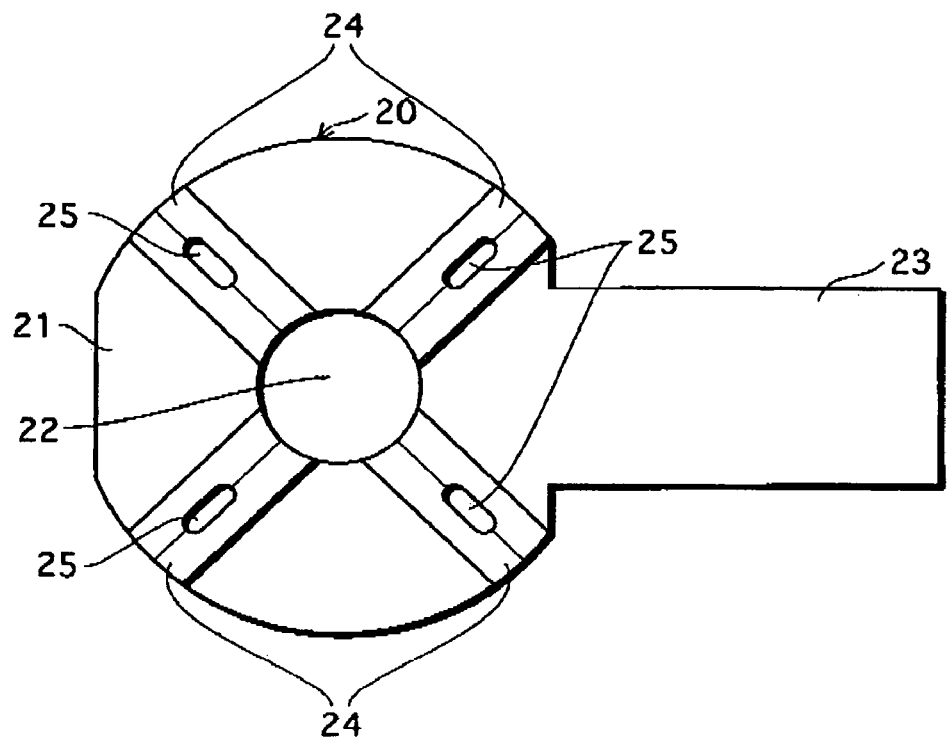
FIG. 3 is a plan view of a positive collector plate of an example C.

FIG. 3 shows the structure of the positive collector plate 20.

The difference from the positive collector plate 10 of the example A is that the main surface of the main body 21 of the example C has cutout regions 25 between an opening region 22 and a peripheral part. The height of the convex part 24 is 0.45 mm, which is the same as the example A, and the length of each cutout region is 2 mm.

With the example C having the stated structure, the same advantageous effect as the example A can be achieved.

Example D

Regarding the example D, the difference from the positive collector plate 20 of the example C is that the cutout region is formed by flanging process, and a projection whose height is 0.45 mm (in the same shape as the shape of the projection 16a shown in FIG. 1C) is formed around the cutout region 25.

With the stated structure, in addition to the advantageous effect of the example C, both high welding strength and high collecting efficiency can be achieved, because a sufficient number of the resistance welding points can be secured in the same manner as in the example B.

Example E

Figure 4:
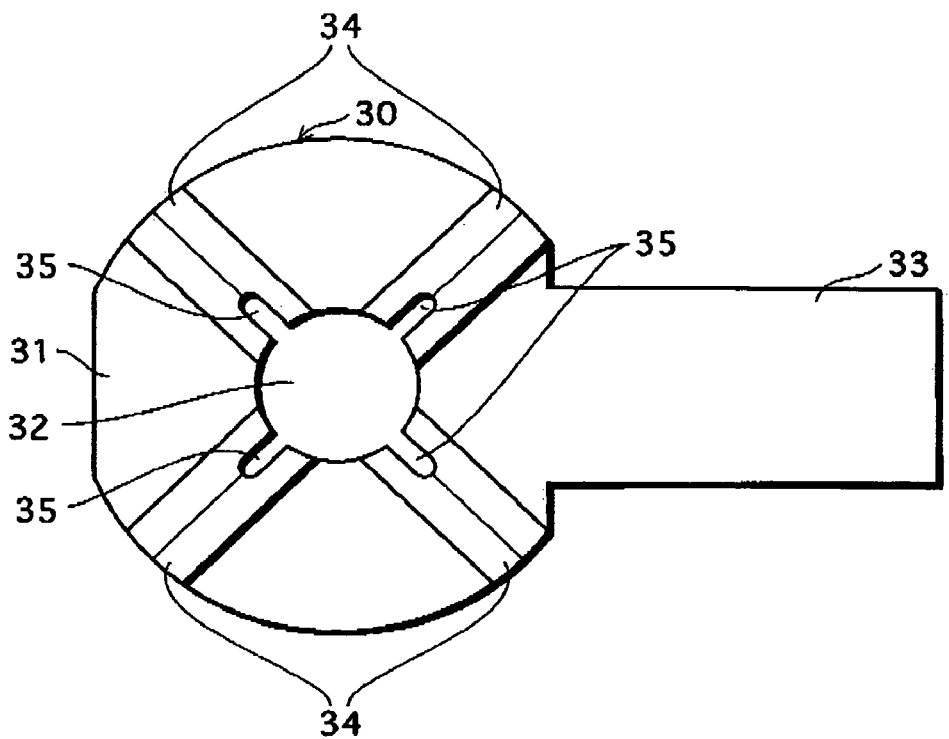
FIG. 4 is a plan view of a positive collector plate of an example E.

FIG. 4 shows the structure of the positive electrode plate 30 of the example D.

The difference from the positive electrode plate 10 of the example A is that the cutout regions 35 of the positive collector plate 30 are connected to the opening region 32.

The height of the convex part 24 is 0.45 mm, which is the same as that of the example A, and the length of each cutout region is 2 mm. With the example E having the stated structure, the same advantageous effect as the example A can be achieved.

Example F

The difference from the positive collector plate 10 of the example E is that the cutout region 35 is formed by flanging process and a projection whose height is 0.45 mm (Although not illustrated, the shape of the projection is the same as that of the projection 16*a* shown in FIG. 1C.) is formed around the cutout region 35.

With the stated structure, in addition to the advantageous effect of the example E, both high welding strength and high collecting efficiency can be achieved, because a sufficient number of the welding points can be secured in the same manner as in the example B.

Example G

Figure 5:
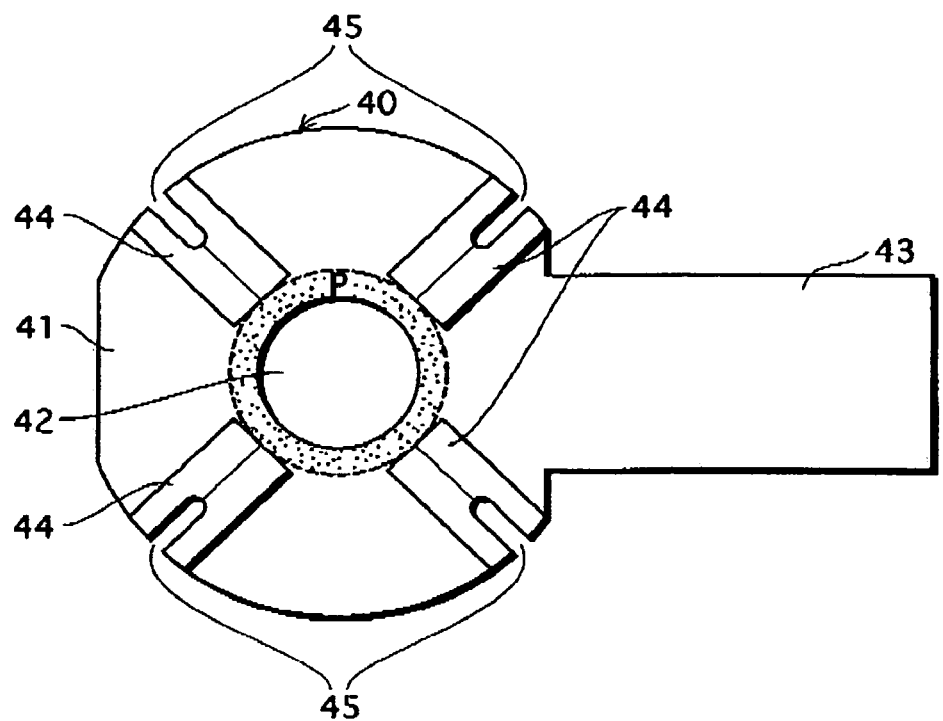
FIG. 5 is a positive collector plate of an example G.

FIG. 5 shows the structure of the positive collector plate 40 of the example G.

The difference from the example A is that a flat part P having a predetermined width is formed around the opening region 42. For instance, the maximum diameter of the main body 41 is 17.5 mm, the diameter of the opening region 42 is 5.3 mm, and the width of the flat part P is 1.0 mm.

With the positive collector plate 40 of the example G having the stated structure, the flat part P prevents a minute distortion of the positive collector plate 40 caused across the convex part 44 by the load applied on the welding electrodes R1 and R2 placed on the positive collector plate 40. As a result, the fluctuation of the welding strength can be decreased.

Measurement of Examples and Comparative Examples

The following describes procedures, results and consideration of a performance measurement on the positive collector plates of the examples A to G in comparison to a positive collector plate of a comparative example.

Note that the structure of the positive collector plate of the comparative example used in this test is the same as the structure of the positive collector plate 10 of the example A except for that the positive collector plate 10 of the comparative example does not has the cutout region 15.

The positive collector plates of the examples A to G and the positive collector plate of the comparative example are respectively named as the positive collector plates A to H in this order.

Manufacturing Method for Ni—Cd Secondary Battery

Firstly, a positive active material slurry 61*b* that includes a binder and a positive active material mainly including nickel hydroxide is filled in a positive core part 61*a* formed of nickel foam. Here, the active material is not filled in a part of the positive core part 61*a* corresponding to the end part 61*c*. The slurry 61*b* is dehydrated after the filling, and pressed to have a predetermined thickness (0.5 mm in this example) and out in a predetermined size (length 200 mm×width 33 mm in this example). As a result, the Ni positive electrode plate 61 shown in FIG. 1 is obtained.

Meanwhile, a negative active material slurry 62*b* that includes a binder and a negative active material mainly including cadmium oxide is applied on the both surfaces of a negative core part 62*a* formed of punching metal. Here, the negative material is not applied on a part of the negative core part 62*a* corresponding to the end part 62*c*. The slurry 62*b* is dehydrated after the application, and pressed to have a predetermined thickness (0.6 mm in this example) and cut in a predetermined size (length 240 mm×width 33 mm in this example). As a result, the Cd negative electrode plate 62 shown in FIG. 1 is obtained.

Secondly, the manufactured Ni positive electrode plate 61 and Cd negative electrode plate 63 are placed to face each other, and a separator 63 (having a width of 34 mm, in this example) made of a polypropylene nonwoven is inserted therebetween. Then, they are spirally wound together. As a result, the electrode assembly 2 is obtained. The winding of the electrode assembly 2 is performed so that the end parts 61*c* and 62*c* are exposed in the longitudinal direction of the electrode assembly 2 to form the points to be welded to the positive and negative collector plates.

Figure 9A:
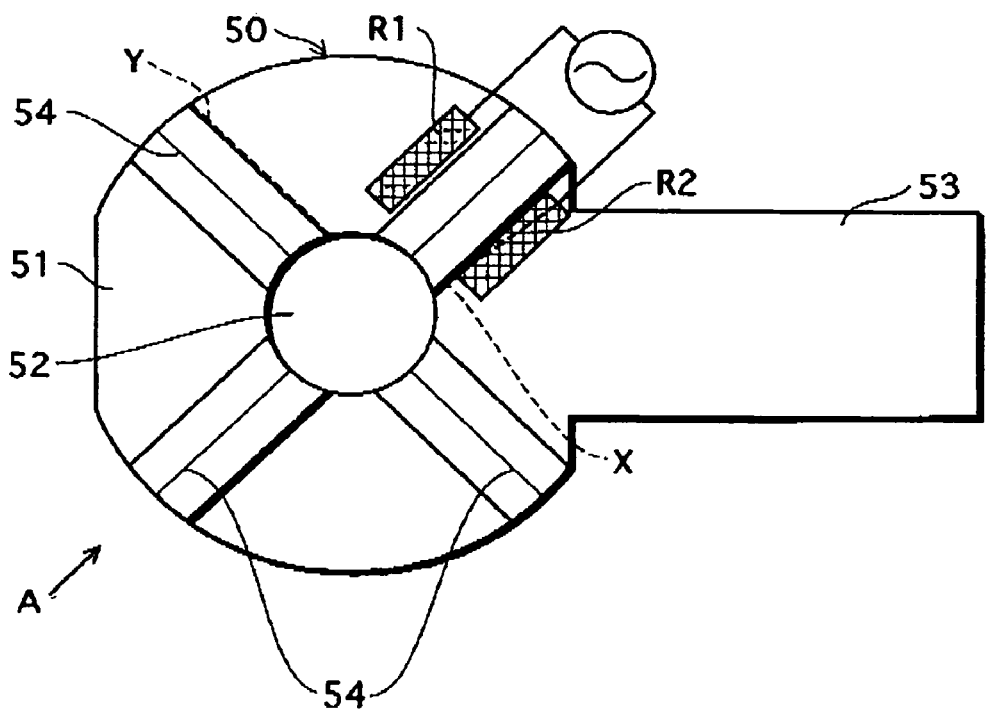
FIG. 9A is a plan view of the positive collector plate of the comparative (conventional) example.

Next, on the top of the manufactured electrode assembly 2, each of the positive collector plates A to H is placed on the end part 61*c* of the Ni positive electrode plate 61. Regarding the positive collector plate A to G, as FIG. 9A shows, a pair of welding electrodes R1 and R2 (see FIG. 5) is placed on the main surface of the main body so as to sandwich the convex part formed on the main body. Then, the welding electrodes R1 and R2 are fed under a predetermined condition (In this example, alternating current at 60 Hz and 1.5 kA is fed three times in each welding). As a result each sandwiched convex part and the end point 61*c* are welded to each other.

Regarding each example having the projections formed by the flanging processing (positive collector plates B, D and F), the pair of the welding electrodes R1 and R2 (see FIG. 5) is placed on the main surface of the main body so as to sandwich the projection part formed on the main body in the same manner as described above. Then, each sandwiched projection and the end point 61*c* are welded to each other.

Further, regarding the comparative example, the end part 61*c* is welded to the positive collector plate H in the same manner as the positive collector plates A to G.

After the welding of the end part 61*c* of each of the positive collector plates A to H and the Ni positive electrode plate 61 to the end part 61*c* is finished, the Cd negative electrode plate 62 and the end part 62*c* are resistance-welded to each other.

With the stated procedures, electric generation units formed by connecting each of the positive and negative collector plates A to H and the electrode assembly 2 are manufactured. In the following description, the units including the positive collector plates A to G are respectively named as the electric generation units A to G, and the unit including the positive collector plate H is named as the electric generation unit H.

Next, Ni—Cd batteries are assembled using the above-described electric generation units A to H respectively.

Firstly, each of the above-described electric generation units A to H is inserted in the casing, and the negative collector plate 64 and a bottom part 651 of the casing 65 are resistance-welded to each other.

Meanwhile, as FIG. 1 shows, the closure construction 66 including the closure plate 66*a*, the closure cap 66*b* and the gasket 67 is prepared, and the lead part 13 extended from the positive collector plate 10 is resistance-welded to the closure plate 66*a*.

Further, grooving processing is performed on the region around the opening part 74 of the casing 65 to form a ring-shaped groove 65*a*. Then, 30% by mass of potassium hydroxide (KOH) aqueous solution is injected into the casing. After that, the gasket 67 placed around the periphery of the closure plate 66*a* is fit to the inner periphery of the casing 65. Then, the top part 65*b* of the casing 65 is caulked on the side of the closure plate 66*a*. As a result, the casing 65 is sealed.

With the stated procedures, the Ni—Cd storage batteries respectively using the electric generating units A to H are manufactured.

Measurement of Welding Strength

In the above-described manufacturing procedures, ten units are made for each of the electric generation units A to H. During the welding, the number of occurrence of burn-off of the electrode assembly is counted by visual observations.

Also, the welding strength of each of the positive collector plates A to H is measured after the positive collector plate is welded to the electrode assembly 2. The relative strength is calculated for each unit, where the welding strength of the electric generation unit H is 100. The relative strengths are measured in the following manner: In each of the electric generation units A to H, the lead part of each of the positive collector plates A to H are pulled in the vertical direction with the electrode assembly 2 being fixed, and the pulling strength by which each of the positive collector plates A to H is detached is measured.

The measurement result is shown in Table 1 below.

TABLE 1

| Collector Plate Type | Relative Strength | Occurrence of Burn-off |
|---|---|---|
| positive collector plate A | 165 | n/a |
| positive collector plate B | 180 | n/a |
| positive collector plate C | 160 | n/a |
| positive collector plate D | 176 | n/a |
| positive collector plate E | 159 | n/a |
| positive collector plate F | 174 | n/a |
| positive collector plate G | 170 | n/a |
| positive collector plate H | 100 | 9 |

Consideration

Figure 9B:
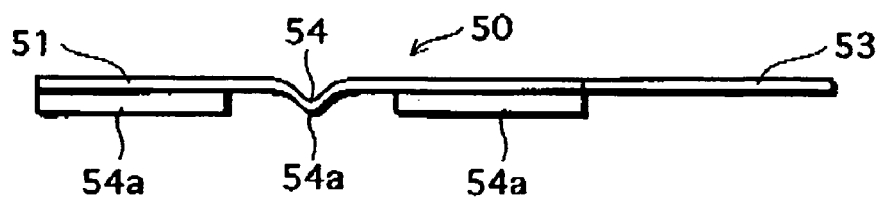
FIG. 9B is a side view of the positive collector plate of the comparative (conventional) example.

As shown in Table 1, the welding strength of each of the positive electrode plates A to G respectively included in the electric generation units A to G is improved from that of the positive electrode plate H of the electric generation unit H by 65% to 80%. Also, the burn-off does not occur. On the contrary, regarding the electric generation unit H, the burn-off occurs in the regions X, Y, which are indicated by dotted lines in FIG. 9, and so on.

Regarding the electric generation units A, C, E and G, the cutout region is included in each of the positive collector plates A, C, E and G, and each linear top part and the end part 61*c* are welded to each other. The current density of the welding part of each of the positive collector plates A, C, E and G is adjusted to be higher than the current density of the positive collector plate H of the comparative example. Accordingly, if the welding electrodes of the positive collector plates A, C, E and G are fed under the same conditions as the comparative example, sufficient Joule heat is generated at the welding points in the examples. As a result, the welding points having favorable properties are formed.

Regarding the electric generation units B, D and F, each of the positive collector plates B, D and F has welding points to the end part 61*c* on the projections formed by the flanging process as well. Therefore, the welding efficiency is more improved than that of the positive collector plates A, C, E and G.

On the contrary, regarding the electric generation unit H, the cutout region is not formed in the positive collector plate H, and the current density at the welding points is not improved. As a result, the welding strength is weaker than those of the other examples.

Standard Deviation of Welding Strength

Next, regarding the electric generation units A and G manufactured in the above-described manner, the relative strength and the coefficient of variation (i.e. CV; the ratio of the standard deviation to the average strength) of the positive collector plate is measured, where the welding strength of the electric generation unit A is 100 (an average value).

The result is shown in Table 2.

TABLE 2

| Collector Plate Type | Relative Strength | CV |
|---|---|---|
| Positive Collector Plate A | 100 | 14% |
| Positive Collector Plate G | 103 | 10% |

As shown in Table 2, as to both the electric generation units A and C, the average of the welding strengths are equally excellent.

Meanwhile, the value of the coefficient of variation (CV) of the welding strength (average) is smaller in the electric generation unit G than in the electric generation unit A.

This is because the convex part 14 is formed on the positive collector plate A of the electric generation unit A so as to extend from the opening region 12 to the periphery of the main body 11, and therefore a minute distortion of the positive collector plate 10 is caused across the convex part 14 by the pressure of the welding electrodes R1 and R2 placed on the main body 11. Accordingly, the welding strength varies to some extent.

On the contrary, regarding the positive collector plate G of the electric generation unit G, the flat part P is formed around the opening region 42. Accordingly, the distortion caused by the pressure of the resistance welding electrodes R1 and R2 around the convex part 44 as a border is prevented, and the variation of the welding strength is decreased.

As described above, the result of the test clearly shows the superiority of the present invention over the comparative example.

<Other Respects>

In the first embodiment and the examples A to C, the case of applying the present invention to the Ni—Cd storage battery is explained. However, in addition to the Ni—Cd storage battery, the present invention is applicable to alkaline batteries such as Ni—HM storage batteries, and Li-ion batteries to achieve the same advantageous effect.

In the above-described first embodiment and the examples A to G, the collector plate connected to the closure construction side is the positive collector plate. However, the present invention is not limited to this as a matter of course. The collector on the closure construction side may be the negative collector plate. If this is the case, although the collector assemblies 10 to 50 and 10*a* respectively explained in the first embodiment and the examples are necessarily used as the negative collector assembly, the same advantageous effect can be achieved with this structure as well.

Figure 6:
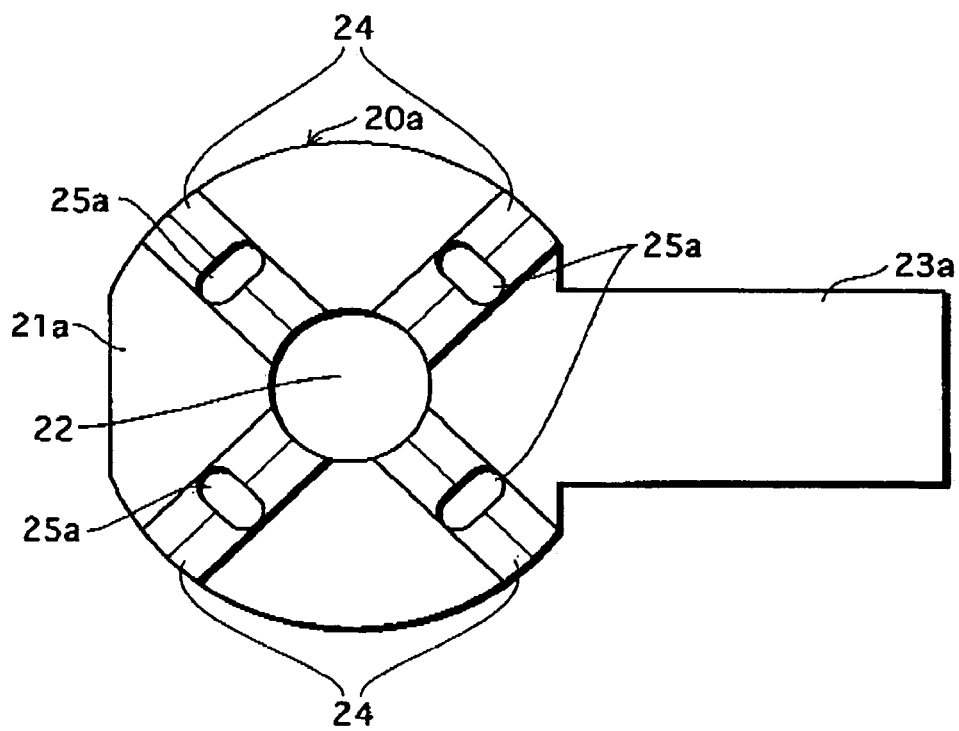
FIG. 6 shows a structure of another positive collector plate according to the present invention.

Further, in the first embodiment and the examples A to G, each cutout region formed in the positive collector plate is in a rectangular shape. However, the present invention is not limited to this. The cutout region may be in other shapes (e.g. a circular shape, a star shape, a slit shape, a polygon shape, or a combination of any of these shapes). FIG. 6 shows a structure of a positive collector plate 20*a* having a cutout region 25a in an oval shape, whose longitudinal direction is vertical to the longitudinal direction of the convex part 24. With such a structure, the same advantageous effect as the example A can be achieved as well.

In the first embodiment and the examples A to G, a cylindrical battery is used for the explanation. However, the present invention is also applicable to batteries in other shapes, such as rectangular batteries.

Figure 7:
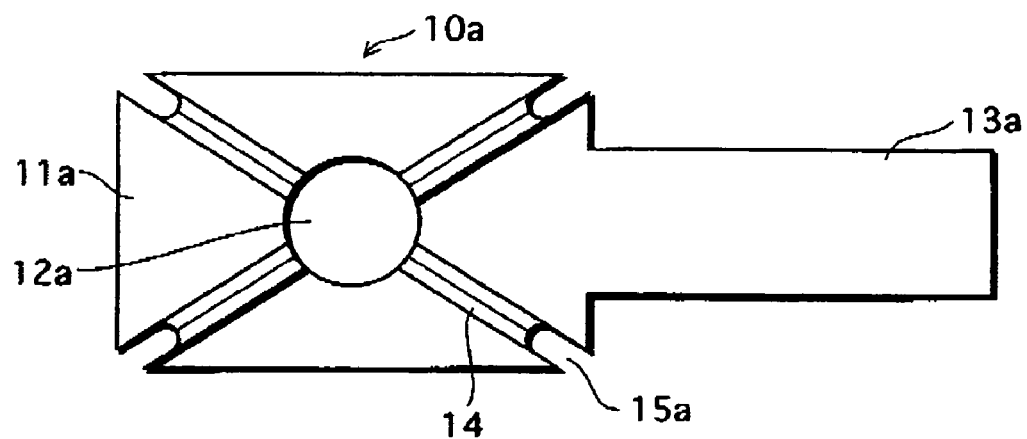
FIG. 7 shows a structure of another positive collector plate (for a rectangular sealed battery) according to the present invention.

FIG. 7 shows the structure of a positive collector plate 10a for a rectangular sealed battery. The structure of the positive collector plate 10a is the same as the example A in FIG. 2 except for the rectangular main body 11a. In other words, the positive collector plate 10a includes a main body 11a having a convex part 14 and a cutout region 15a, and a rectangular lead part 13a is connected to the main body 11a. In this rectangular sealed battery, a positive electrode plate and a negative electrode plate, which sandwich a separator, are spirally wound together to form an electrode assembly (not illustrated), and the electrode assembly is pressed from the side to be a in a flat shape, and housed in a rectangular casing.

Such a rectangular sealed battery having the positive collector plate 10a can achieve the improvement of the welding strength and the collecting efficiency in the welding in the same manner as in the example A.

Further, in the rectangular sealed battery, a layered electrode assembly in which positive and negative electrode plates are layered so as to sandwich a separator may be used instead of the wound electrode assembly 2.

Figure 8:
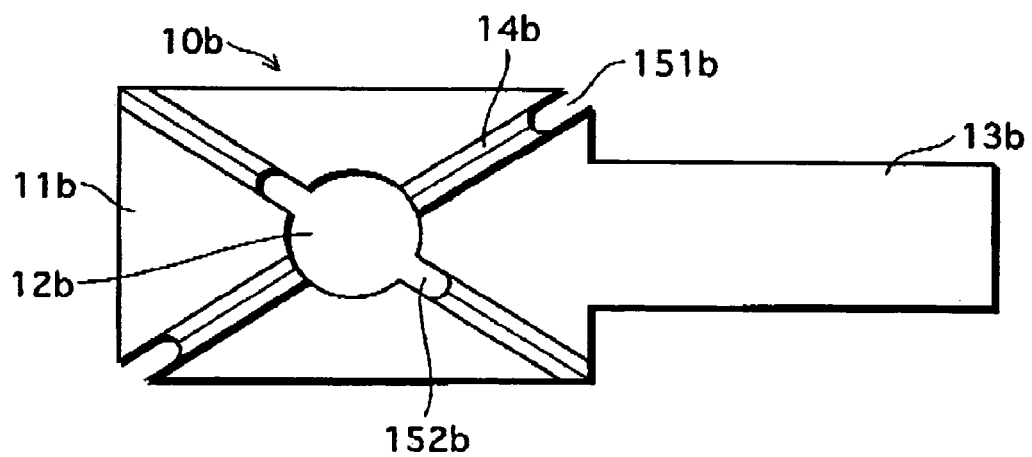
FIG. 8 shows a structure of another positive collector plate (for a rectangular sealed battery) according to the present invention.

If this is the case, each electrode plate is required to be separately connected to the positive collector plate. If the cutout regions are formed only at the periphery of the main body, it is impossible to connect regions where the cutout regions are formed and the positive collector plate. Therefore, as FIG. 8 shows, the cutout regions 151b and 152b are formed at different positions on the convex part 14b. In the specific example shown in FIG. 8, the cutout regions 151a and the 152b are formed in the main body 11b of the positive collector plate 10b, at different positions on the two diagonal lines that are formed by the convex-parts 14b and cross the center point of the opening region 12b. With the stated structure, each convex part 14b of the positive collector plate 10b and all the positive end parts included in the electrode assembly are welded to each other, and excellent collecting efficiency can be achieved.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A battery that includes an electrode assembly including a positive electrode plate and a negative electrode plate layered so as to sandwich a separator, a collector plate being connected to an end part of at least one of the positive electrode plate and the negative electrode plate, wherein
   the collector plate includes a main body, on one main surface of which one or more convex parts each having a top extending linearly are formed,
   one or more cutout regions having an elongated shape are formed by partially cutting out each convex part such that a longitudinal direction of each cutout region is in parallel with a longitudinal direction of the top of the corresponding convex part and tips of both ends of each cutout region are in alignment with a longitudinal direction of the top of the corresponding convex part, and
   each convex part is resistance-welded to the end part of the electrode assembly at a plurality of welding points, with use of an electric current that flows along the one main surface of the main body of the collector plate.

2. The battery of claim 1 in a cylindrical shape, wherein the main body is substantially in a circular shape, and
   a plurality of the convex parts are formed on the main surface of the main body, each convex part radiating from a center region of the main body toward a periphery of the main body.

3. The battery of claim 2, wherein
   each cutout region is formed by cutting out the periphery of the main body.

4. The battery of claim 1, wherein
   a center region of the main body has an opening.

5. The battery of claim 4, wherein
   at least one of the cutout regions is continuous with the opening.

6. The battery of claim 4, wherein
   at least one of the cutout regions is formed between the opening and the periphery of the main body.

7. The battery of claim 4, wherein
   a flat part having a predetermined width is formed on the main surface of the main body to surround the opening.

8. The battery of claim 1, wherein
   each cutout region is formed by flanging processing, and
   a projection formed at processed part by the flanging processing is welded to the end part of the electrode assembly.

9. The battery of claim 1, wherein
   the collector plate and the electrode assembly are housed in a casing sealed with a closure construction, and
   the collector plate is electrically connected to the closure construction.

10. The battery of claim 1, wherein
    each convex part and the end part are welded to each other.

11. The battery of claim 1, wherein the collector plate is connected to an end part of the positive electrode plate and said positive electrode plate is made from nickel foam.

* * * * *